(12) United States Patent
Lucchi (10) Patent No.: US 7,073,659 B1
(45) Date of Patent: Jul. 11, 2006

(54) LOW BACK PRESSURE MODULE WITH L-SHAPED INTERMEDIATE SUPPORT

(75) Inventor: Marco Lucchi, Münchestein (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/137,021

(22) Filed: May 25, 2005

(51) Int. Cl.
*B65G 17/24* (2006.01)
(52) U.S. Cl. ...................... 198/779; 198/853
(58) Field of Classification Search ........ 195/850–853, 195/779
See application file for complete search history.

(56) References Cited

U.S. PATENT DOCUMENTS

| | | | |
|---|---|---|---|
| 4,271,960 A | 6/1981 | Chalich | |
| 4,821,860 A | 4/1989 | Hodlewsky | |
| 4,821,869 A * | 4/1989 | Hodlewsky | 198/779 |
| 4,880,107 A * | 11/1989 | Deal | 198/779 |
| 4,909,380 A | 3/1990 | Hodlewsky | |
| 5,096,050 A | 3/1992 | Hodlewsky | |
| 5,143,205 A | 9/1992 | Fujimoto | |
| 5,224,583 A * | 7/1993 | Palmaer et al. | 198/779 |
| 5,261,525 A | 11/1993 | Garbagnati | |
| 5,330,045 A | 7/1994 | Hodlewsky | |
| 6,398,015 B1 | 6/2002 | Sedlacek et al. | |

* cited by examiner

*Primary Examiner*—James R. Bidwell
(74) *Attorney, Agent, or Firm*—Hodgson Russ LLP (57) ABSTRACT

A low back pressure belt module for forming an endless belt for use with a conveyor. The modular conveyor belt is formed of rows of belt modules pivotally interlinked by transverse pivot rods. The belt modules have a plurality of first link ends disposed in the direction of belt travel and a plurality of second link ends disposed in the opposite direction. Transverse holes in the link ends are aligned to accommodate a pivot rod. When the link ends of the consecutive rows of side-by-side modules are intercalated, the pivot rod serves as a hinge pin in a hinged joint between consecutive interlinked rows. The low back pressure belt modules include shafts supported above the top surface of the module. The shafts carry a plurality of rollers to form a low back pressure conveying surface. A pair of intermediate supports may be provided for each shaft. The intermediate supports are L-shaped and disposed in mirror relation such that one support engages one side of the shaft and the other support engages the other side of the shaft in complementary fashion. The intermediate supports are offset in the transverse direction such that the shaft is disposed in an open configuration with access to the shaft for cleaning and without a narrow slot for debris to accumulate.

16 Claims, 9 Drawing Sheets

LOW BACK PRESSURE MODULE WITH L-SHAPED INTERMEDIATE SUPPORT

FIELD OF THE INVENTION

This invention relates to conveyor belts and, more particularly, to modular plastic conveyor belts formed of rows of plastic belt modules pivotally interlinked by transverse pivot rods.

BACKGROUND OF THE INVENTION

When transporting articles by means of a conveyor, there are many instances in which the articles will back up or accumulate on the conveyor. When articles accumulate, they push against each other building up back pressure. A large back pressure is unacceptable when the articles being carried by the conveyor are fragile because the force of the articles pushing against each other tends to damage them. The back pressure also puts an extra load on the conveyor and sprockets and causes sliding friction and abrasion of the conveyor.

There have been solutions to the back pressure problems described above. U.S. Pat. No. 4,909,380 ("the '380 patent") discloses a solution to backline pressure that includes providing shafts mounted above the top surface of belt modules. Each shaft carries a plurality of rollers forming a low back pressure conveying surface. The patent also discloses the use of an intermediate support for the shaft that permits the use of a smaller diameter shaft for wider belt modules thereby conserving material and reducing cost.

Figure 4:
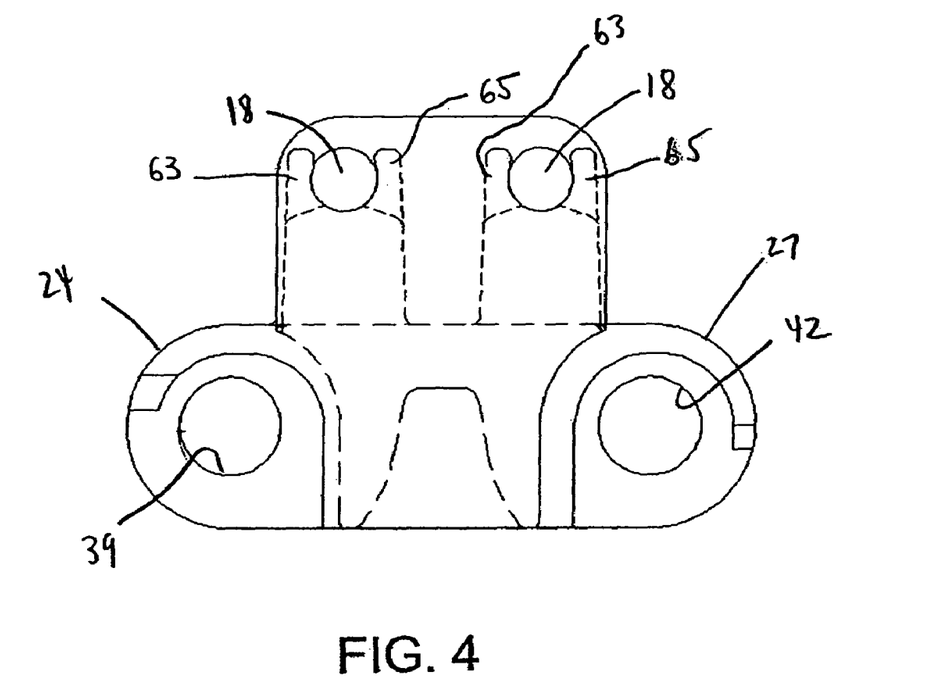
FIG. 4 is an end elevational view of the belt module of the present invention including the shafts.
Figure 5:
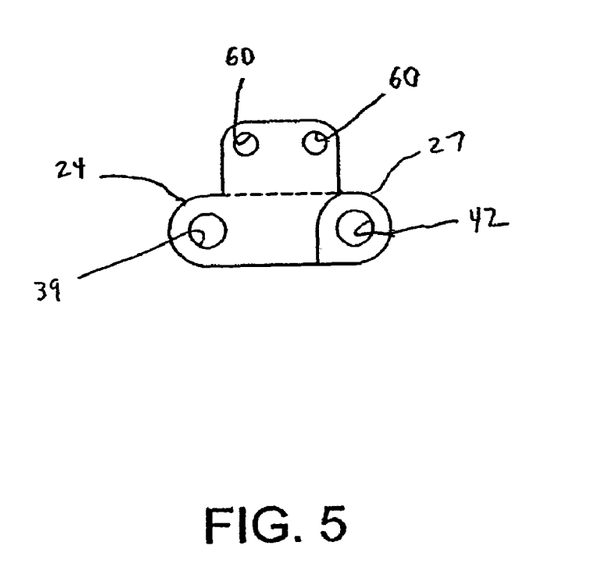
FIG. 5 is an end elevational view of the belt module of the present invention.

The intermediate support shown in the '380 patent is an upstanding wall having slot-like indentations in the top surface adapted to receive and support the shafts as best shown in FIG. 4. The slot-like indentations are narrow and completely surround the shaft making them difficult to clean without removing the shafts and therefore these indentations may lead to unsanitary conditions in food conveying applications.

Accordingly, what is needed is a low back pressure module that is easier to clean.

SUMMARY OF THE INVENTION

The present invention meets the above-described need by providing a belt module with a base portion having a first end, a second end, and an intermediate section extending in a transverse direction from the first end to the second end. The module includes a first plurality of link ends extending from the intermediate section in a direction of belt travel substantially perpendicular to the transverse direction. Each of the first plurality of link ends have first openings that are aligned in the transverse direction.

The module includes a second plurality of link ends extending from the intermediate section in a direction opposite to the first link ends. The second plurality of link ends each have second openings aligned in the transverse direction.

A first intermediate support is disposed in spaced apart relation to the first end of the base portion. The first intermediate support has a first side wall and a second side wall. The first side wall has a length that is greater than the length of the second side wall. The first intermediate support has a shaft support surface disposed between the first side wall and the second side wall.

A second intermediate support has a first side wall and a second side wall. The first side wall has a length that is greater than the second side wall. The second intermediate support has a shaft support surface disposed between the first side wall and the second side wall. The second intermediate support is offset from the first intermediate support in the transverse direction and is disposed in facing relation to the first intermediate support.

The first and second intermediate support provide complementary support to both sides of the shaft, but due to the offset arrangement in the transverse direction the shaft is open for cleaning and there is less chance for any debris to accumulate around the shaft.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
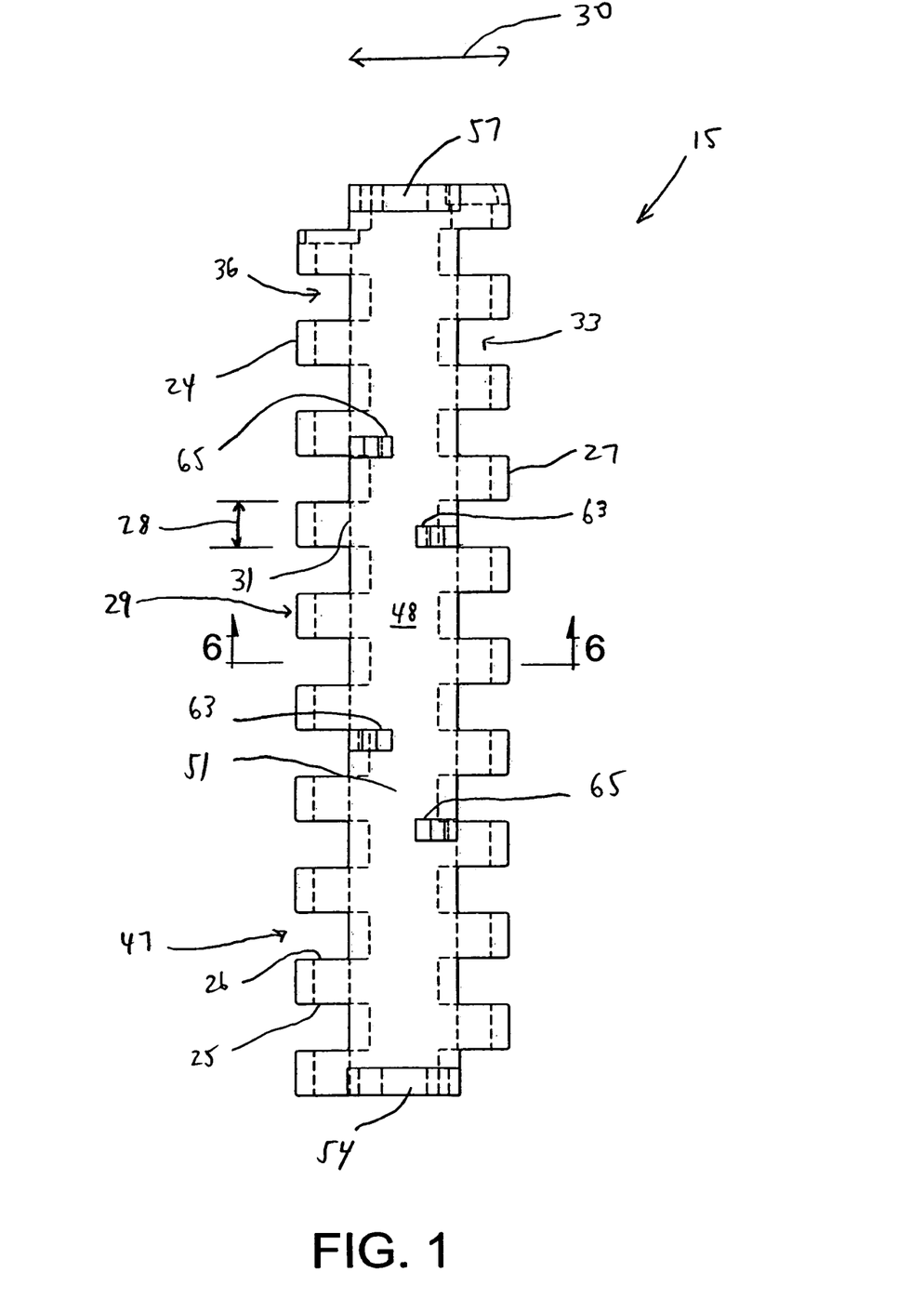
FIG. 1 is a top plan view of the low back pressure belt module of the present invention with the shafts and rollers removed for clarity.
Figure 2:
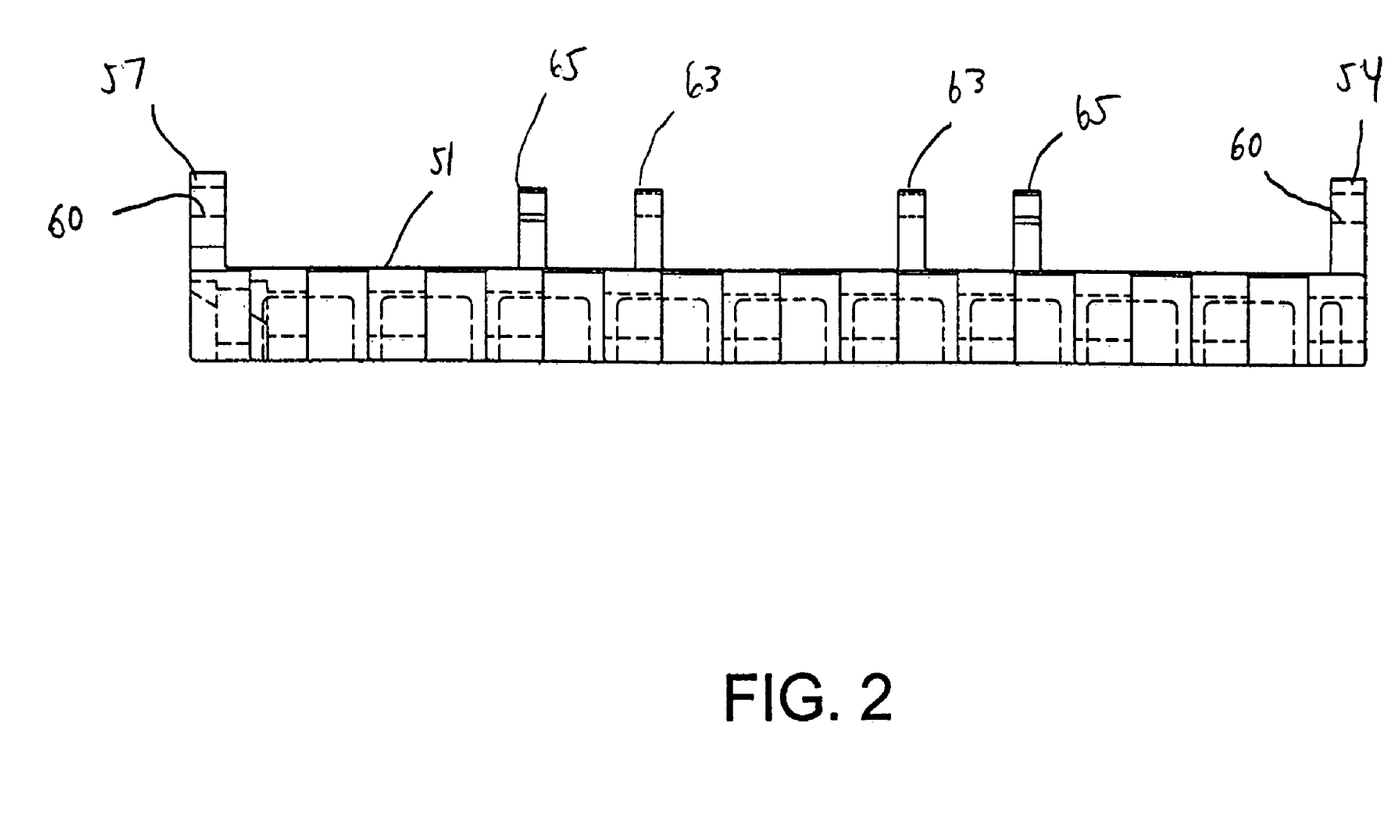
FIG. 2 is a side elevational view of the belt module shown in FIG. 1.
Figure 3:
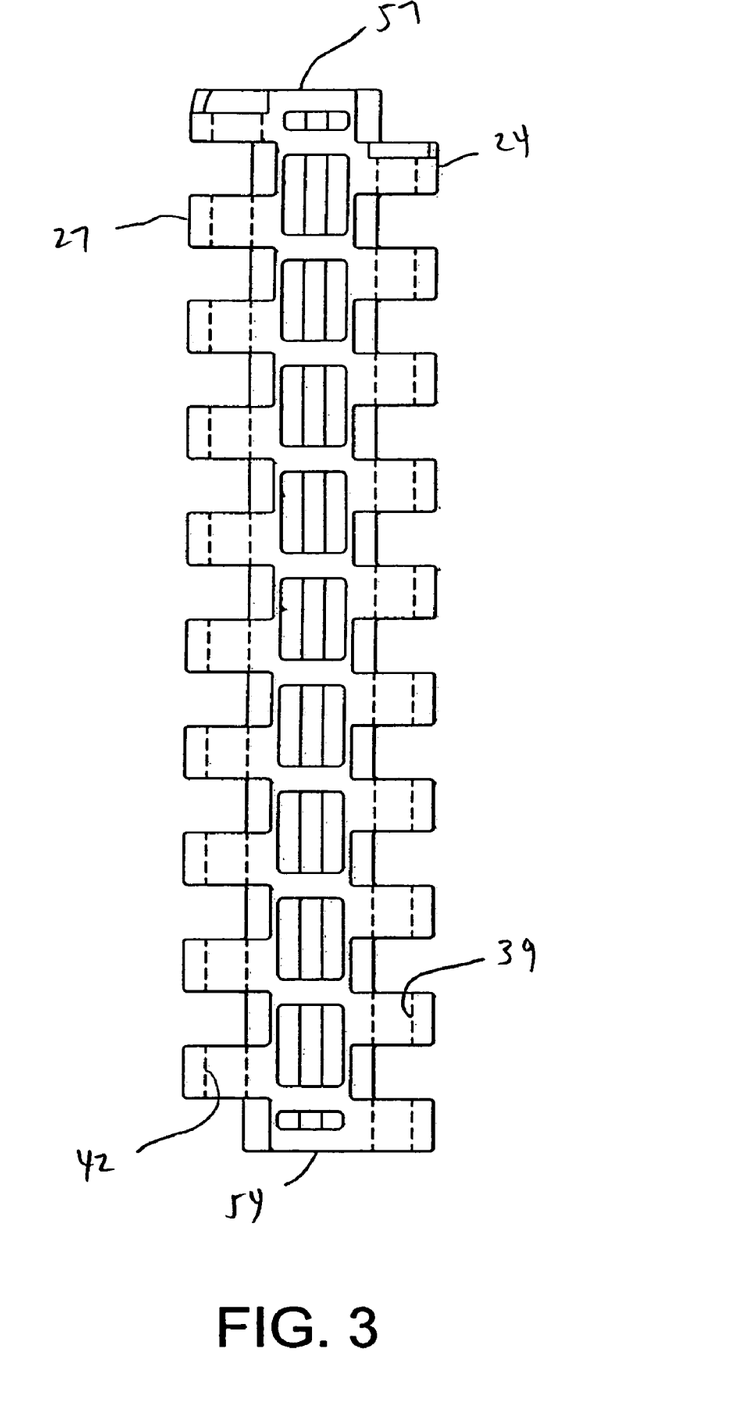
FIG. 3 is a bottom plan view of the belt module of FIG. 1.
Figure 6:
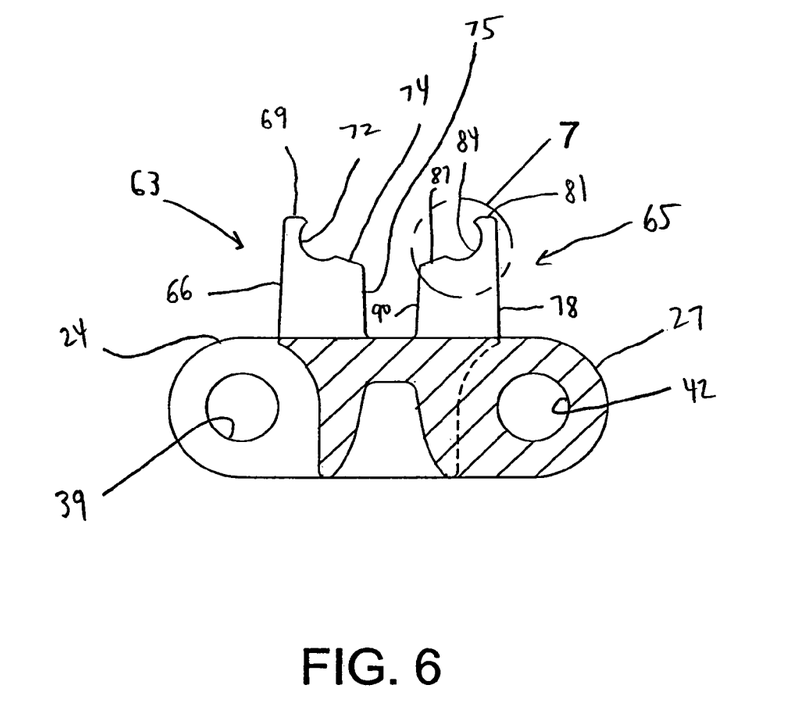
FIG. 6 is a cross-sectional view taken along lines 6—6 of FIG. 1.
Figure 7:
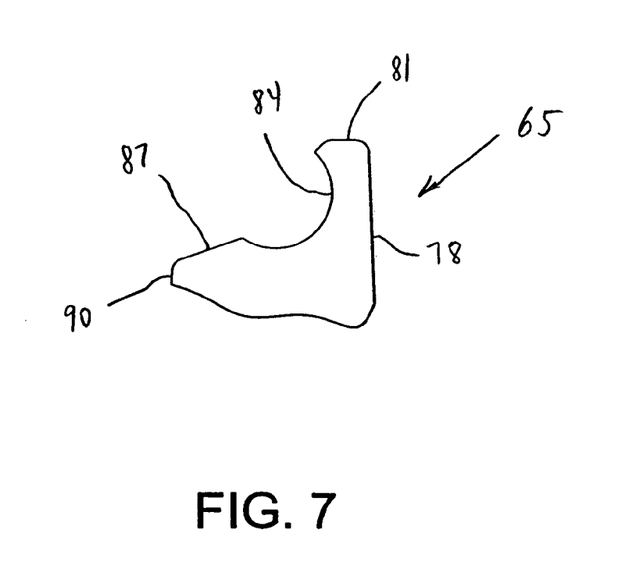
FIG. 7 is an enlarged view of a portion of the module shown in FIG. 6.
Figure 8:
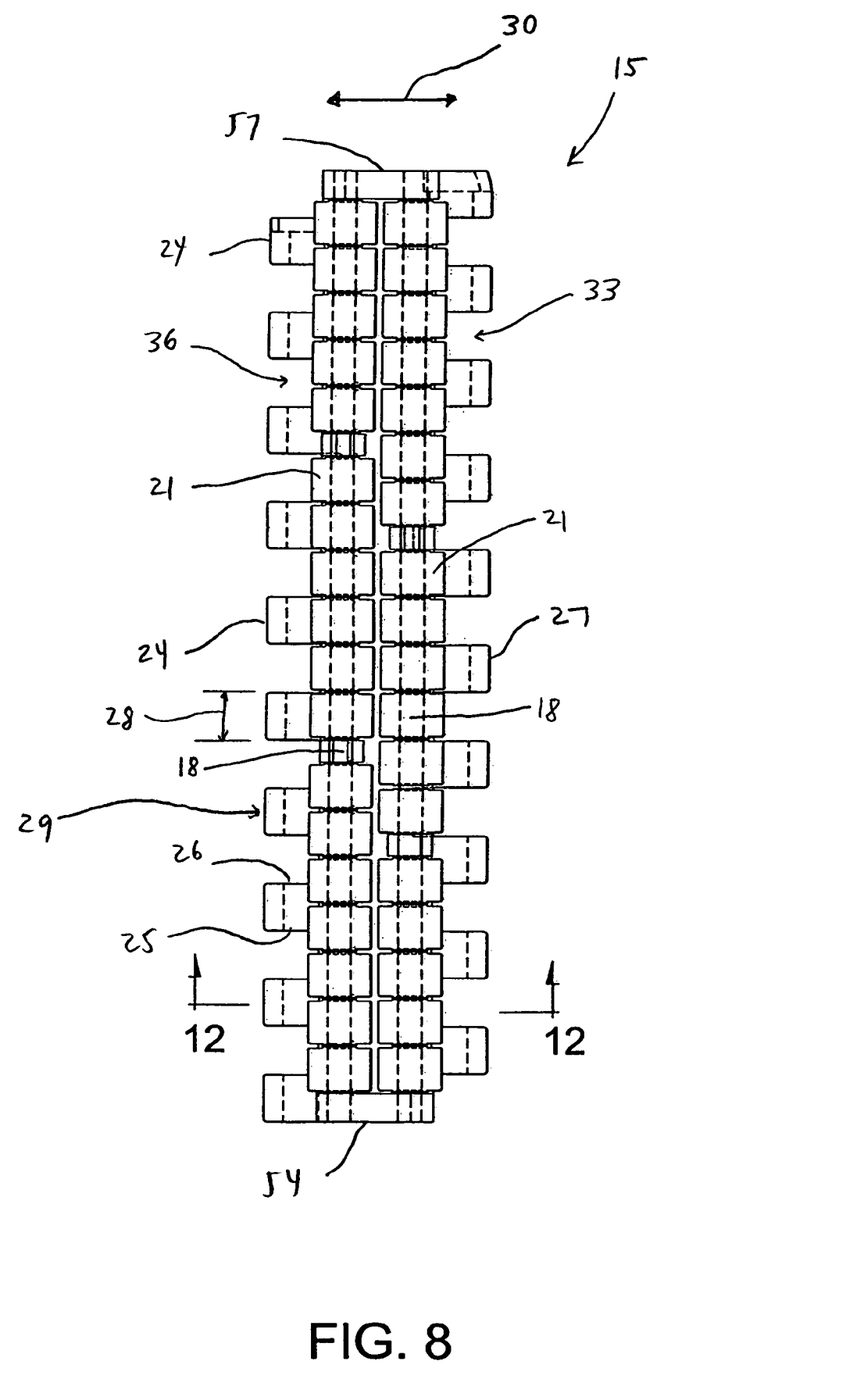
FIG. 8 is a top plan view of the belt module of the present invention including the shafts and rollers.
Figure 9:
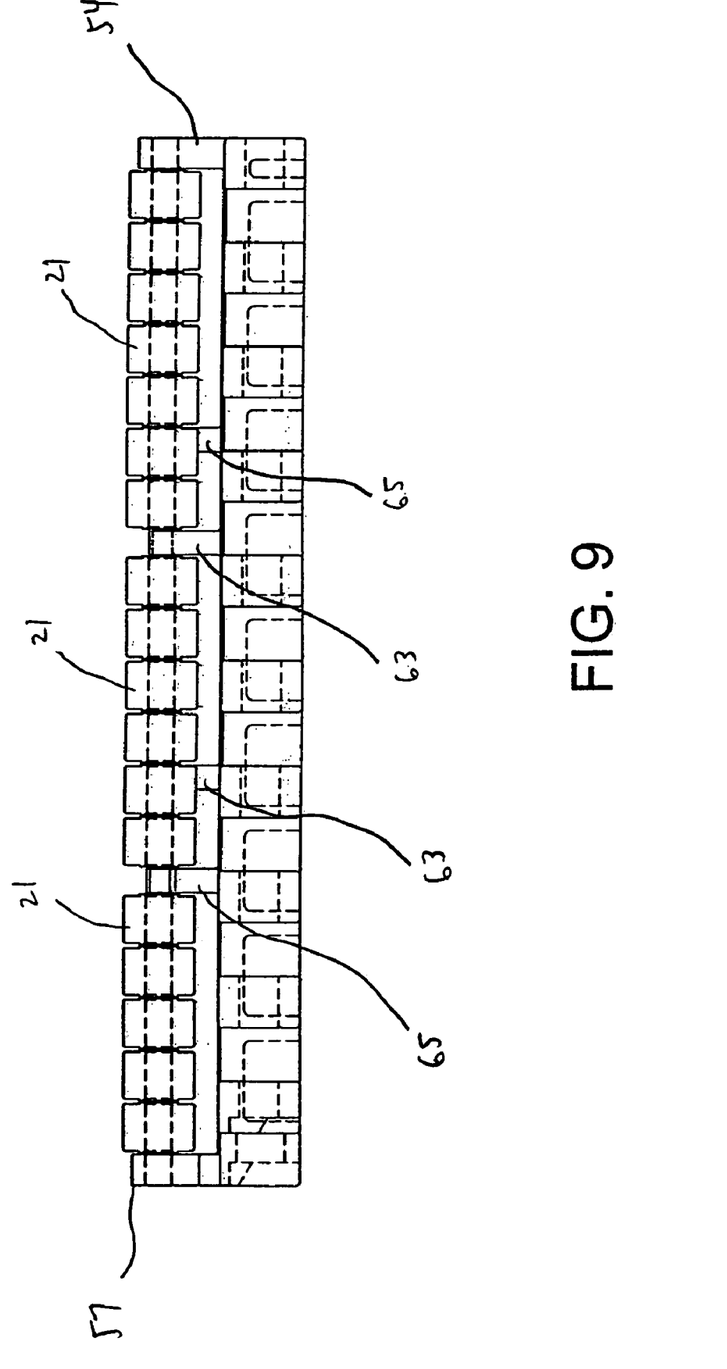
FIG. 9 is a side elevational view of the belt module shown in FIG. 8.
Figure 10:
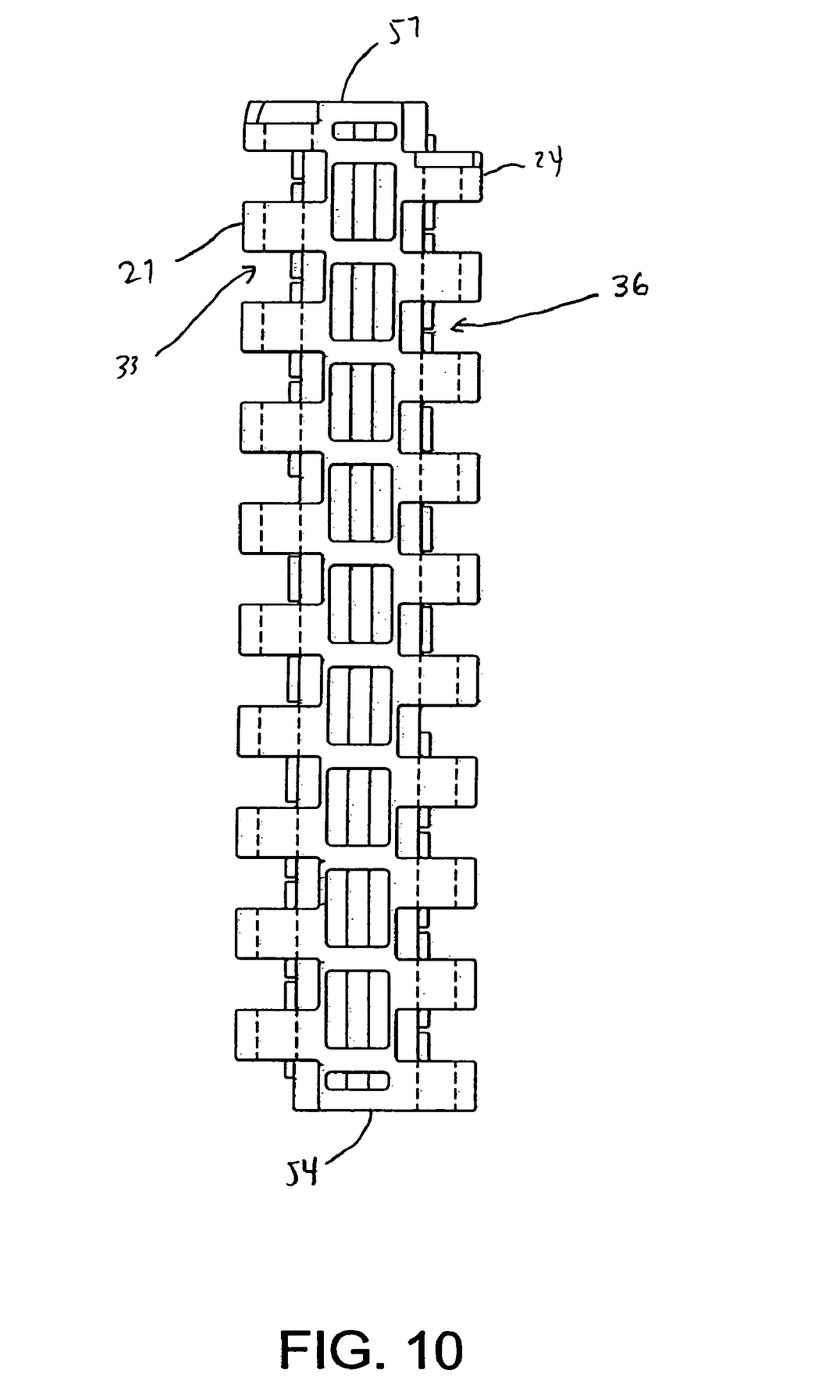
FIG. 10 is a bottom plan view of the belt module of FIG. 8.
Figure 11:
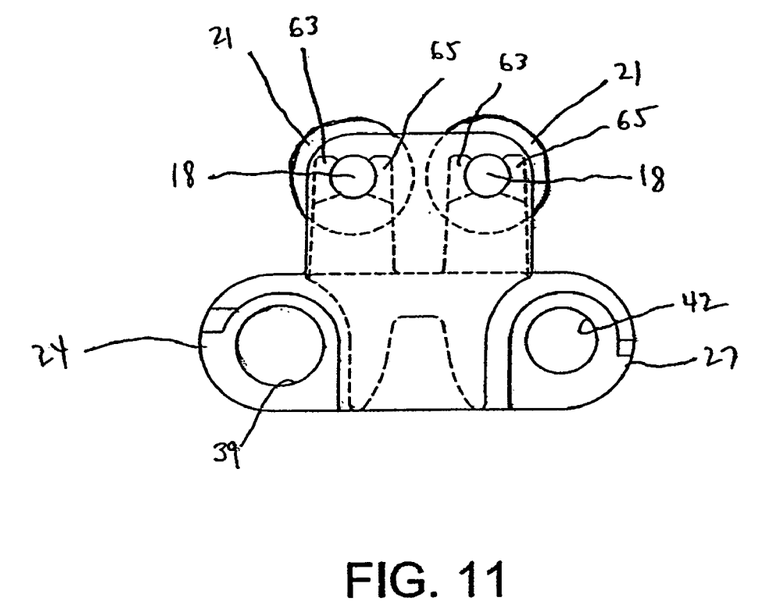
FIG. 11 is an end elevational view of the belt module shown in FIG. 8.
Figure 12:
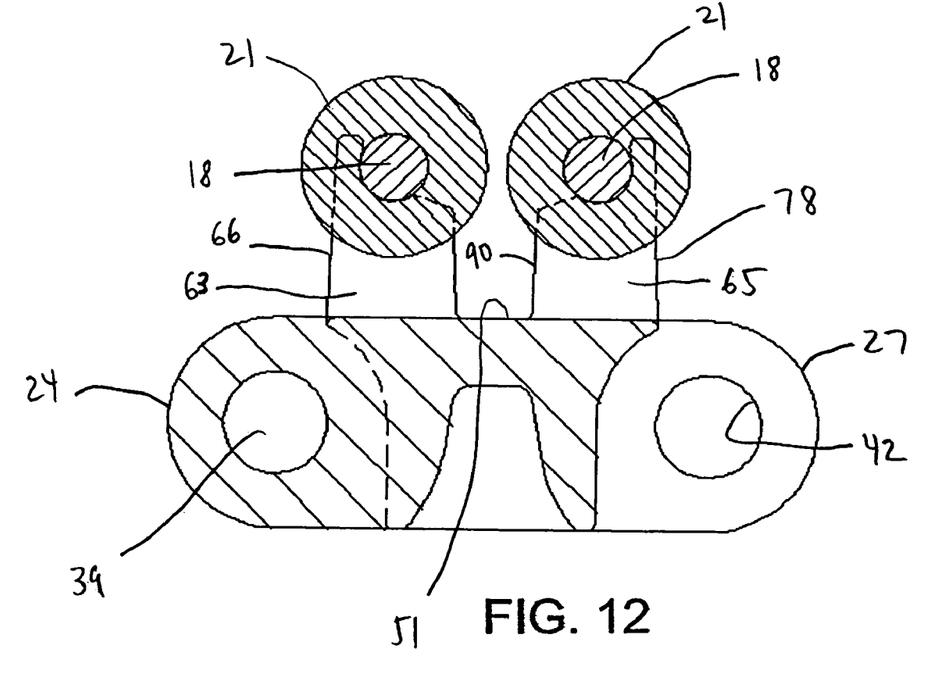
FIG. 12 is a cross-sectional view taken along lines 12—12 of FIG. 8.

Referring to FIGS. 1–12 generally and initially to FIG. 8, the low back pressure belt module 15 of the present invention includes a pair of shafts 18 supported above the top surface of the module 15. The shafts 18 support a plurality of rollers 21 to provide a low friction conveying surface. The module 15 has a first plurality of link ends 24 and a second plurality of link ends 27 disposed opposite from the first link ends 24. The first plurality of link ends 24 have opposed side walls 25, 26 that provide a transverse thickness 28 connected to an intermediate section 48 at a first proximal portion 31 (FIG. 1). The transverse thickness 28 extends in a direction of belt travel 30 from the intermediate section 48 to a first distal portion 29. The second plurality of link ends 27 have similar geometry except they extend opposite to each other in the direction of belt travel indicated by arrow 30. As will be evident to those of ordinary skill in the art based on this disclosure, the belt module 15 may be driven in either direction along arrow 30.

The link ends 24 and 27 are offset in a direction transverse to the direction of belt travel. Accordingly, adjacent modules 15 can be positioned such that the link ends 24 fit in the spaces 33 disposed between link ends 27, and link ends 27 fit in the spaces 36 disposed between link ends 24. The link ends 24, 27 have transverse openings 39 and 42 (FIG. 11) (which are shown partially and in broken lines in FIG. 8) that extend through the transverse thickness 28 between and to the opposed side walls 25, 26. As will be evident to those of ordinary skill in the art, modules 15 can be positioned such that link ends 24 and 27 are intercalated with the link ends 24 and 27 of an adjacent module 15. The side-by-side and intercalated modules 15 can then be connected by pivot rods 45 (FIG. 11) to provide an endless belt capable of articulating about a sprocket to form a conveying system.

Turning to FIGS. 1–8, module 15 is formed out of plastic or other materials suitable for many applications including conveying of food products. The material should be lightweight, non-corrosive, and easily cleaned. The module 15 is thermoformed from a plastic resin raw material as known to those of ordinary skill in the art. The module 15 has a base portion 47 with an intermediate section 48 extending between first and second link ends 24, 27. Intermediate section 48 has an upper deck surface 51 having a substantially rectangular shape in plan view. At opposite ends of the upper surface 51 in a direction transverse to the direction of belt travel, shaft support members 54 and 57 extend upward from the intermediate section 48. The shaft support members 54, 57 have openings 60 for receiving and supporting the ends of the shafts 18. The openings 60 comprise a circular bore formed in the shaft support members 54, 57 and are bounded by a curved inner wall having a diameter slightly larger than the diameter of the shaft 18. Each opening 60 supports one of the shafts 18 and the shafts are preferably fixed by at least one knurled shaft end.

Intermediate shaft support members 63, 65 extend upward from the upper surface 51 of module 15. The intermediate shaft support members 63, 65 are disposed in two rows along the intermediate section 48 in the transverse direction. Turning to FIG. 6, intermediate shaft support member 63 has an L-shaped "left-hand" configuration with an outer wall 66 facing the outside of the module 15. The outer wall 66 extends from the upper surface 51 to a top surface 69. From the top surface 69, the member 63 extends downward along a curved shaft support surface 72 for receiving the shaft 18. The curved shaft support surface 72 extends to portion 74 extending to an inner wall 75 disposed toward the middle of the intermediate section 48.

As best shown in FIG. 7, intermediate shaft support member 65 has a "right-hand" configuration that is also L-shaped but is a mirror image of the intermediate shaft support member 63. Intermediate shaft support member 65 has an outer wall 78 that is substantially perpendicular to the top surface 51 of module 15. The outer wall 78 extends upward from the surface 51 until it reaches a top surface 81. Surface 81 extends to a curved shaft support surface 84 that receives the shaft 18. Curved shaft support surface 84 extends to portion 87 which in turn extends to the top portion of an inner wall 90 disposed toward the middle of the intermediate section 48.

Returning to FIG. 4, the mirror-imaged, L-shaped intermediate shaft support members 63 and 65 are aligned in the transverse direction with the openings 60 in the shaft support members 54 and 57 such that the shaft 18 is supported by each of the intermediate shaft support members 63, 65. The curved shaft support surfaces 72 and 84 align in the transverse direction such that opposite sides of the shaft 18 are supported as best shown in FIG. 4. Because the curved openings are aligned in the transverse direction with regard to the sides of the shaft 18, the intermediate shaft support members 63, 65 provide excellent support for the shaft 18. The arrangement of the intermediate support members 63, 65 in mirrored relation provides complementary support for opposite sides of the shaft 18. However, the staggered arrangement of the "left-hand" and "right-hand" shaft support members provides an open configuration with access to the shaft for cleaning and without a narrow slot for debris to accumulate. As an alternative, a single intermediate shaft support member 63 may be used in instances where the shaft support members 54, 57 are close enough to provide sufficient additional support.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module comprising:
a base portion having a first end, a second end, and an intermediate section extending in a transverse direction from the first end to the second end;
a first plurality of link ends extending from the intermediate section in a direction of belt travel substantially perpendicular to the transverse direction, the first plurality of link ends each having first openings defined therein, the first openings aligned in the transverse direction;
a second plurality of link ends extending from the intermediate section in a direction opposite to the first link ends, the second plurality of link ends each having second openings defined therein, the second openings aligned in the transverse direction; and,
at least one first intermediate support disposed in spaced apart relation to the first end of the base portion, the first intermediate support having a first side wall and a second side wall, the first side wall having a length greater than the second side wall, the at least one first intermediate support having a shaft support surface disposed between the first side wall and the second side wall.

2. The belt module of claim 1, further comprising:
at least one second intermediate support having a first side wall and a second side wall, the first side wall having a length greater than the second side wall, the at least one second intermediate support having a shaft support surface disposed between the first side wall and the second-side wall, the at least one second intermediate support offset from the first intermediate support in the transverse direction and disposed in facing relation to the first intermediate support.

3. The belt module of claim 2, wherein the second intermediate support is disposed in mirror image relation to the first intermediate support.

4. The belt module of claim 1, wherein the shaft support surface comprises an arcuate portion.

5. The belt module of claim 2, wherein the at least one shaft is disposed between the at least one first intermediate support and the at least one second intermediate support.

6. The belt module of claim 1, wherein the at least one first intermediate support further comprises a top surface disposed substantially parallel to the upper surface of the intermediate section.

7. The belt module of claim 1, wherein the first and second side walls of the at least one first intermediate support member are substantially parallel.

8. The belt module of claim 1, wherein the first and second side walls of the at least one first intermediate support member are disposed substantially perpendicular to the upper surface of the intermediate section.

9. A belt module comprising:
- a base portion having an intermediate section with an upper surface;
- a first plurality of link ends each having opposed side walls providing the first link ends with a first transverse thickness connected to the intermediate section at a first proximal portion and extending from the intermediate section in a direction of belt travel to a first distal portion at the link ends, wherein the first link ends each have a first opening through the thickness between and to the opposed side walls;
- a second plurality of link ends each having opposed side walls providing the second link ends with a second transverse thickness connected to the intermediate section at a second proximal portion and extending from the intermediate section in a direction opposite to the first link ends to a second distal portion at the link ends, wherein the second link ends each have a second opening through the thickness between and to the opposed side walls;
- first and second shaft support members extending upward from the base portion and having openings for receiving a shaft;
- at least one shaft extending between the first and second shaft support members and supported thereon;
- a plurality of rollers mounted for rotation on each of the shafts;
- at least one first intermediate support having a first side wall and a second side wall, the first side wall having a length greater than the second side wall, the at least one first intermediate support having a shaft support surface disposed between the first and second side wall; and,
- at least one second intermediate support having a first side wall and a second side wall, the first side wall having a length greater than the second side wall, the at last one second intermediate support having a shaft support surface disposed between the first and second side wall, the at least one second intermediate support offset from the first intermediate support in a direction transverse to the direction of belt travel and disposed in facing relation to the first intermediate support.

10. The belt module of claim 9, wherein the second intermediate support is disposed in mirror image relation to the first intermediate support.

11. The belt module of claim 9, wherein the shaft support surface comprises an arcuate portion.

12. The belt module of claim 9, wherein the at least one shaft is disposed between the at least one first intermediate support and the at least one second intermediate support.

13. The belt module of claim 9, wherein the at least one first intermediate support further comprises a top surface disposed substantially parallel to the upper surface of the intermediate section.

14. The belt module of claim 9, wherein the first and second side walls of the at least one first intermediate support member are substantially parallel.

15. The belt module of claim 1, wherein the first and second side walls of the at least one first intermediate support member are disposed substantially perpendicular to the upper surface of the intermediate section.

16. A method of forming a low back pressure belt module comprising:
- providing a base portion having an intermediate section with an upper surface;
- providing a first plurality of link ends each having opposed side walls providing the first link ends with a first transverse thickness connected to the intermediate section at a first proximal portion and extending from the intermediate section in a direction of belt travel to a first distal portion at the link ends, wherein the first link ends each have a first opening through the thickness between and to the opposed side walls;
- providing a second plurality of link ends each having opposed side walls providing the second link ends with a second transverse thickness connected to the intermediate section at a second proximal portion and extending from the intermediate section in a direction opposite to the first link ends to a second distal portion at the link ends, wherein the second link ends each have a second opening through the thickness between and to the opposed side walls;
- providing first and second shaft support members extending upward from the base portion and having openings for receiving a shaft;
- providing at least one shaft extending between the first and second shaft support members and supported thereon;
- providing a plurality of rollers mounted for rotation on each of the shafts;
- providing at least one first intermediate support having a first side wall and a second side wall, the first side wall having a length greater than the second side wall, the at least one first intermediate support having a shaft support surface disposed between the first and second side wall; and,
- providing at least one second intermediate support having a first side wall and a second side wall, the first side wall having a length greater than the second side wall, the at last one second intermediate support having a shaft support surface disposed between the first and second side wall, the at least one second intermediate support offset from the first intermediate support in a direction transverse to the direction of belt travel and disposed in facing relation to the first intermediate support.

* * * * *